US007610927B2

(12) United States Patent
Schmitz

(10) Patent No.: US 7,610,927 B2
(45) Date of Patent: Nov. 3, 2009

(54) APPARATUS, SYSTEM AND METHOD FOR MONITORING FLUID FLOWS AND/OR FILTER CONDITIONS AND/OR DISTRIBUTING A SINGLE FLUID

(76) Inventor: Geoffrey W. Schmitz, 413 Lasalle St., Wausau, WI (US) 54403

( * ) Notice: Subject to any disclaimer, the term of this patent is extended or adjusted under 35 U.S.C. 154(b) by 646 days.

(21) Appl. No.: 11/299,421

(22) Filed: Dec. 12, 2005

(65) Prior Publication Data

US 2007/0131287 A1 Jun. 14, 2007

(51) Int. Cl.
*F16K 37/00* (2006.01)
*F16D 31/02* (2006.01)

(52) U.S. Cl. ........................... 137/1; 137/558; 137/549; 137/550; 137/574; 137/592

(58) Field of Classification Search ................. 137/558, 137/545, 549, 550, 1, 574, 592
See application file for complete search history.

(56) References Cited

U.S. PATENT DOCUMENTS

| | | | |
|---|---|---|---|
| 2,500,627 | A | 3/1950 | Chinn |
| 2,585,348 | A | 2/1952 | Robinson |
| 2,764,177 | A | 9/1956 | Paasche |
| 3,073,123 | A | 1/1963 | Hodgson et al. |
| 3,197,960 | A | 8/1965 | Forster |
| 3,321,056 | A | 5/1967 | Winchell et al. |
| 3,470,693 | A | 10/1969 | Bookout et al. |
| 3,641,879 | A | 2/1972 | Week et al. |
| 3,664,129 | A | 5/1972 | Schwab |
| 3,993,094 | A | 11/1976 | Spooner |
| 4,005,636 | A | 2/1977 | Dunn |
| 4,043,419 | A | 8/1977 | Larson et al. |
| 4,075,840 | A | 2/1978 | Jesswein |
| 4,127,143 | A | 11/1978 | Zinga |
| 4,130,990 | A | 12/1978 | Amedei et al. |
| 4,144,946 | A | 3/1979 | Melocik |
| 4,174,018 | A | 11/1979 | Liebert et al. |
| 4,179,888 | A | 12/1979 | Goscenski, Jr. |

(Continued)

OTHER PUBLICATIONS

"Mobil Delvac 1 High-Performance Synthetic, Heavy-Duty Diesel Engine Oil," Mobil Product Data Sheet, Mobil Oil Corporation, 1984-1999.

(Continued)

*Primary Examiner*—Kevin L Lee
(74) *Attorney, Agent, or Firm*—Patents & TMS, P.C.

(57) ABSTRACT

An apparatus, a system and a method monitor fluid flows and/or filter conditions and/or distribute a single fluid. The apparatus and the system supply and/or maintain fluid requirements of one or more hydraulic systems with the single fluid from a reservoir. The filtered inlets transfer and/or add the single fluid to an interior of the reservoir. Each of the filtered inlets have a sensor to monitor, to detect and/or to determine fluid flows and/or fluid conditions of the single fluid in and/or filter conditions of one or more filtered inlets. Distribution of the single fluid to one or more hydraulic systems is prioritized by a single fluid in a first volume or in a second volume of an interior of the reservoir. A partition in the interior of the reservoir separates and/or forms the second volume and the first volume of the reservoir. The reservoir has one or more outlet ports for distributing and/or for supplying the single fluid to one or more hydraulic systems.

21 Claims, 3 Drawing Sheets

U.S. PATENT DOCUMENTS

| | | | | |
|---|---|---|---|---|
| 4,189,919 | A | | 2/1980 | Goscenski, Jr. |
| 4,206,689 | A | | 6/1980 | Peterson |
| 4,223,646 | A | | 9/1980 | Kinder |
| 4,343,151 | A | | 8/1982 | Lorimor |
| 4,410,058 | A | | 10/1983 | Dymond |
| 4,414,809 | A | | 11/1983 | Burris |
| 4,425,766 | A | | 1/1984 | Claypole |
| 4,439,984 | A | | 4/1984 | Martin |
| 4,446,697 | A | | 5/1984 | Goscenski, Jr. |
| 4,454,717 | A | | 6/1984 | Wade et al. |
| 4,531,368 | A | | 7/1985 | Killen |
| 4,635,678 | A | * | 1/1987 | Peterman et al. ............ 137/551 |
| 4,721,185 | A | | 1/1988 | Weigle |
| 4,738,330 | A | | 4/1988 | Suzuki et al. |
| 4,794,883 | A | | 1/1989 | Fukami et al. |
| 4,798,050 | A | | 1/1989 | Nakamura et al. |
| 4,798,177 | A | | 1/1989 | Oomura et al. |
| 5,241,823 | A | | 9/1993 | Stone et al. |
| 5,513,490 | A | | 5/1996 | Howell et al. |
| 5,535,845 | A | | 7/1996 | Buschur |
| 5,561,978 | A | | 10/1996 | Buschur |
| 5,669,461 | A | | 9/1997 | Buschur |
| 5,687,568 | A | | 11/1997 | Buschur |
| 5,778,693 | A | | 7/1998 | Mientus |
| 5,875,630 | A | | 3/1999 | Walsh et al. |
| 5,881,630 | A | | 3/1999 | Buschur et al. |
| 5,946,911 | A | | 9/1999 | Buschur et al. |
| 5,960,628 | A | | 10/1999 | Machesney et al. |
| 5,975,233 | A | | 11/1999 | Eisenbacher |
| 6,016,657 | A | | 1/2000 | Buschur |
| 6,021,641 | A | | 2/2000 | Buschur et al. |
| 6,227,221 | B1 | | 5/2001 | Schmitz |
| 6,311,724 | B1 | | 11/2001 | Tracey et al. |
| 6,913,040 | B2 | | 7/2005 | Crossman et al. |

OTHER PUBLICATIONS

Buck, W.H. And Lohuis, J.R., "Lubricant Effects on Low-Temperature Diesel Engine Cold Starting," SAE Technical Paper Series 940097, Feb. 1994.

Kennedy, S., Ragomo, M.W., Lohuis, J.R., and Richman, W.H., "A Synthetic Diesel Engine Oil with Extended Laboratory Test and . . . " SAE Technical Paper Series 952553, Oct. 1995.

* cited by examiner

APPARATUS, SYSTEM AND METHOD FOR MONITORING FLUID FLOWS AND/OR FILTER CONDITIONS AND/OR DISTRIBUTING A SINGLE FLUID

BACKGROUND OF THE INVENTION

The present invention generally relates to an apparatus, a system and a method for monitoring fluid flows and/or filter conditions and/or for distributing a single fluid. More specifically, the present invention relates to an apparatus, a system and a method for monitoring fluid flows, fluid conditions and/or filter conditions via a sensor attached to one or more filter inlets of a reservoir. An interior of the reservoir may be partitioned into a first volume and/or a second volume. The sensor may detect and/or may determine fluid flows and/or conditions of a single fluid in and/or a filter condition of the filter inlets. The single fluid may be distributed from the first volume and/or from the second volume of the reservoir via one or more outlet ports and/or one or more drains. The single fluid may supply and/or may maintain fluid requirements of one or more hydraulic systems.

It is, of course, generally known that a vehicle hydraulic system has one or more fluids stored in one or more reservoirs to supply and/or to maintain fluid requirements of one or more hydraulic systems of the vehicle. Dirt, dust, moisture and/or contaminants from an environment that is exterior to the hydraulic systems may cause contamination and/or incursion of dirt, dust and/or moisture into the hydraulic systems. As a result, a fluid filtration must be integrated into the hydraulic system to prevent degradation and/or deterioration of the hydraulic system and/or the one or more fluids from the contamination.

Each of the hydraulic systems has an independent reservoir which may maintain and/or may monitor the fluids of each of the hydraulic systems. As a result, each of the hydraulic systems is limited to qualities of the fluid available within each of the hydraulic systems. Each of the hydraulic systems requires a cooling system and/or a sensor to monitor and/or to maintain a fluid condition in and/or a temperature of the fluid in each of the hydraulic systems. As a result, a complexity of the vehicle may be increased based on the cooling systems and/or the sensors of each of the hydraulic systems.

A need, therefore, exists for an apparatus, a system and a method for monitoring fluid flows and/or filter conditions and/or for distributing a single fluid. Further, a need exists for an apparatus, a system and a method for monitoring fluid flows, fluid conditions and/or filter conditions which may have one or more filtered inlets to remove dirt, dust, moisture and/or contaminates from a single fluid being received by the filtered inlets. Still further, a need exists for an apparatus, a system and a method for monitoring fluid flows and/or filter conditions which may have a sensor connected to one or more filter inlets to monitor, to maintain and/or to determine fluid flows and/or fluid conditions of a single fluid in and/or filter conditions of one or more filter inlets. Moreover, a need exists for an apparatus, a system and a method for monitoring fluid flows and/or filter conditions which may have a reservoir with a first volume, a second volume and/or one or more outlet ports to prioritize a distribution of a single fluid from the reservoir to one or more hydraulic systems. Furthermore, a need exists for an apparatus, a system and a method for monitoring fluid flows and/or filter conditions which may have a single fluid fill point, a common reservoir check point and an electronic level monitor to minimize opportunities for contamination and simplify maintenance of the apparatus and the system.

SUMMARY OF THE INVENTION

The present invention relates to an apparatus, a system and a method for monitoring fluid flows and/or filter conditions and/or for distributing a single fluid. The apparatus and the system have a reservoir with one or more filtered inlets for receiving a single fluid and/or for adding the single fluid to the reservoir. The reservoir may have a first volume and/or a second volume which may be separated and/or may be formed by a partition. Each of the filtered inlets may have a sensor for detecting, for determining and/or for monitoring a fluid flow and/or a fluid condition of the single fluid in and/or a filter condition of each of the filtered inlets. The apparatus and the system may have one or more outlet ports for distributing and/or supplying the single fluid from the reservoir to one or more hydraulic systems. The apparatus and the system may prioritize the single fluid in the first volume and the second volume for distributing the single fluid from the reservoir.

To this end, in an embodiment of the present invention, an apparatus for distributing a single fluid to a hydraulic system is provided. The apparatus has a container having a bottom and walls defining an interior. Further, the apparatus has a partition having a top end and a bottom end wherein the bottom end of the partition is attached to the bottom of the container forming a first volume and a second volume in the container wherein the second volume surrounds the first volume. Still further, the apparatus has a plurality of fluid inlets in communication with the first volume wherein the single fluid is added to the container via one of the plurality of fluid inlets. Moreover, the apparatus has an outlet port located within the interior of the container wherein the single fluid is distributed from the container to the hydraulic system via the outlet port.

In an embodiment, the apparatus has a sensor connected at one of the plurality of fluid inlets wherein the sensor detects fluid flow of the single fluid.

In an embodiment, the apparatus has a valve connected to one of the plurality of fluid inlets wherein the single fluid is monitored via the valve.

In an embodiment, the apparatus has a filter associated with one of the plurality of fluid inlets wherein the filter removes a contaminant from the single fluid.

In an embodiment, the apparatus has a gage installed in the wall of the container wherein the gage indicates a level of the single fluid in the container.

In an embodiment, the apparatus has a level sensor connected to the interior of container wherein the level sensor indicates a level of the single fluid in the container.

In an embodiment, the apparatus has a sleeve connected to the compartment and one of the plurality of fluid inlets.

In an embodiment, the second priority volume receives the single fluid from the first priority volume.

In another embodiment of the present invention, a system for monitoring fluid flow of a single fluid is provided. The system has a reservoir having a bottom and walls defining an interior. Further, the system has a partition having a top end and a bottom end wherein the bottom end of the partition is attached to the bottom of the reservoir forming a first volume and a second volume in the reservoir wherein the second volume surrounds the first volume. Still further, the system has a plurality of fluid inlets in communication with the first volume wherein the single fluid is added to the container via one of the plurality of fluid inlets. Moreover, the system has a sensor connected to one of the plurality of fluid inlets wherein the sensor detects the fluid flow of the single fluid into the reservoir.

In an embodiment, the system has an outlet port within the interior of the reservoir.

In an embodiment, the system has a filter attached to one of the plurality of fluid inlets wherein the filter removes a contaminant from the single fluid.

In an embodiment, the system has a valve connected to one of the plurality of fluid inlets wherein the single fluid is monitored via the valve.

In an embodiment, the second volume receives the single fluid from the first volume.

In an embodiment, the single fluid is distributed from the interior of the reservoir via the outlet port.

In another embodiment of the present invention, a method for distributing a single fluid is provided. The method has the steps of providing a reservoir defining an interior and dividing the interior of the reservoir into a first volume and a second volume. Further, the method has the step of inserting a plurality of fluid inlets into the first volume of the reservoir wherein the single fluid is added to the reservoir via one of the plurality of fluid inlets. Moreover, the method has the step of providing a first outlet port within the first volume and a second outlet port within the second volume wherein the single fluid is distributed from the interior of the reservoir.

In an embodiment, the method has the step of monitoring a level of the single fluid within the reservoir.

In an embodiment, the method has the step of detecting fluid flow of the single fluid.

In an embodiment, the method has the step of removing a contaminant from the single fluid.

In an embodiment, the method has the step of adding the single fluid to the second volume via the first volume.

In an embodiment, the method has the step of transferring the single fluid in the interior of the reservoir to a first hydraulic system.

It is therefore, an advantage of the present invention to provide an apparatus, a system and a method for monitoring fluid flows and/or filter conditions and/or for distributing a single fluid which may supplying, may deliver and/or may maintain fluid requirements for one or more hydraulic systems.

A further advantage of the present invention is to provide an apparatus, a system and a method for monitoring fluid flows and/or filter conditions and/or for distributing a single fluid which may have a reservoir for storing, for distributing and/or for transferring a single fluid to one or more hydraulic systems.

A still further advantage of the present invention is to provide an apparatus, a system and a method for monitoring fluid flows and/or filter conditions and/or for distributing a single fluid which may have one or more filtered inlets to supply, to transfer and/or to add a single fluid to a reservoir.

And, another advantage of the present invention is to provide an apparatus, a system and a method for monitoring fluid flows and/or filter conditions and/or for distributing a single fluid which may determine and/or may detect fluid flows and/or fluid conditions of a single fluid in and/or a filter condition of one or more filtered inlets of a reservoir.

A still further of the present invention is to provide an apparatus, a system and a method for monitoring fluid flows and/or filter conditions and/or for distributing a single fluid which may partition a reservoir into a first volume and/or a second volume for storing and/or for distributing a single fluid from the reservoir.

And, another advantage of the present invention is to provide an apparatus, a system and a method for monitoring fluid flows and/or filter conditions and/or for distributing a single fluid which may remove dirt, dust, moisture and/or contaminants from a single fluid via one or more filtered inlets.

Moreover, an advantage of the present invention is to provide an apparatus, a system and a method for monitoring fluid flows and/or filter conditions and/or for distributing a single fluid which may filter a single fluid from one or more hydraulic systems prior to transferring the single fluid to a reservoir.

And, another advantage of the present invention is to provide an apparatus, a system and a method for monitoring fluid flows and/or filter conditions and/or for distributing a single fluid which may have one or more fluid sample valves attached to one or more filtered inlets of a reservoir.

A still further advantage of the present invention is to provide an apparatus, a system and a method for monitoring fluid flows and/or filter conditions and/or for distributing a single fluid which may have an electronic level sensor and/or a visual site glass connected to an interior of a reservoir for monitoring a single fluid in an interior of the reservoir.

Yet another advantage of the present invention is to provide an apparatus, a system and a method for monitoring fluid flows and/or filter conditions and/or for distributing a single fluid which may have an outlet port of a first volume and/or of a second volume of a reservoir for distributing a single fluid from the reservoir.

A still further advantage of the present invention is to provide an apparatus, a system and a method for monitoring fluid flows and/or filter conditions and/or for distributing a single fluid which may have a vent or a drain connected to an interior of a reservoir.

And, another advantage of the present invention is to provide an apparatus, a system and a method for monitoring fluid flows and/or filter conditions and/or for distributing a single fluid which may prioritize a single fluid in a first volume of a reservoir or in a second volume of the reservoir for distributing the single fluid from the reservoir.

Moreover, an advantage of the present invention is to provide an apparatus, a system and a method for monitoring fluid flows and/or filter conditions and/or for distributing a single fluid which may prioritize distribution of a single fluid from a first volume or a second volume to one or more hydraulic systems.

And, another advantage of the present invention is to provide an apparatus, a system and a method for monitoring fluid flows and/or filter conditions and/or for distributing a single fluid which may detect and/or may determine conditions of a single fluid and/or a filtered inlet.

A still further advantage of the present invention is to provide an apparatus, a system and a method for monitoring fluid flows and/or filter conditions and/or for distributing a single fluid which may prioritize distribution of a single fluid from a reservoir based on one or more hydraulic systems.

Yet another advantage of the present invention is to provide an apparatus, a system and a method for monitoring fluid flows and/or filter conditions and/or for distributing a single fluid which may remove contaminants in a single fluid from one or more inlets prior to adding the single fluid to a reservoir.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an apparatus, a system and a method for monitoring fluid flows and/or filter conditions and/or for distributing a single fluid. More specifically, the present invention relates to an apparatus, a system and a method for monitoring fluid flows and/or filter conditions which may supply and/or may maintain fluid requirements of one or more hydraulic systems with a single fluid from a reservoir. One or more filtered inlets may transfer and/or may add the single fluid to the reservoir. One or more filtered inlets may have a sensor to monitor, to detect and/or to determine fluid flows, fluid conditions and/or filter conditions of one or more filtered inlets. Distribution of the single fluid to one or more hydraulic systems may be prioritized by a single fluid in a first volume of or in a second volume of an interior of the reservoir. A partition in the interior of the reservoir may separate and/or may form the second volume and the first volume of the reservoir. The reservoir may have one or more outlet ports for distributing the single fluid to one or more hydraulic systems.

Figure 1:
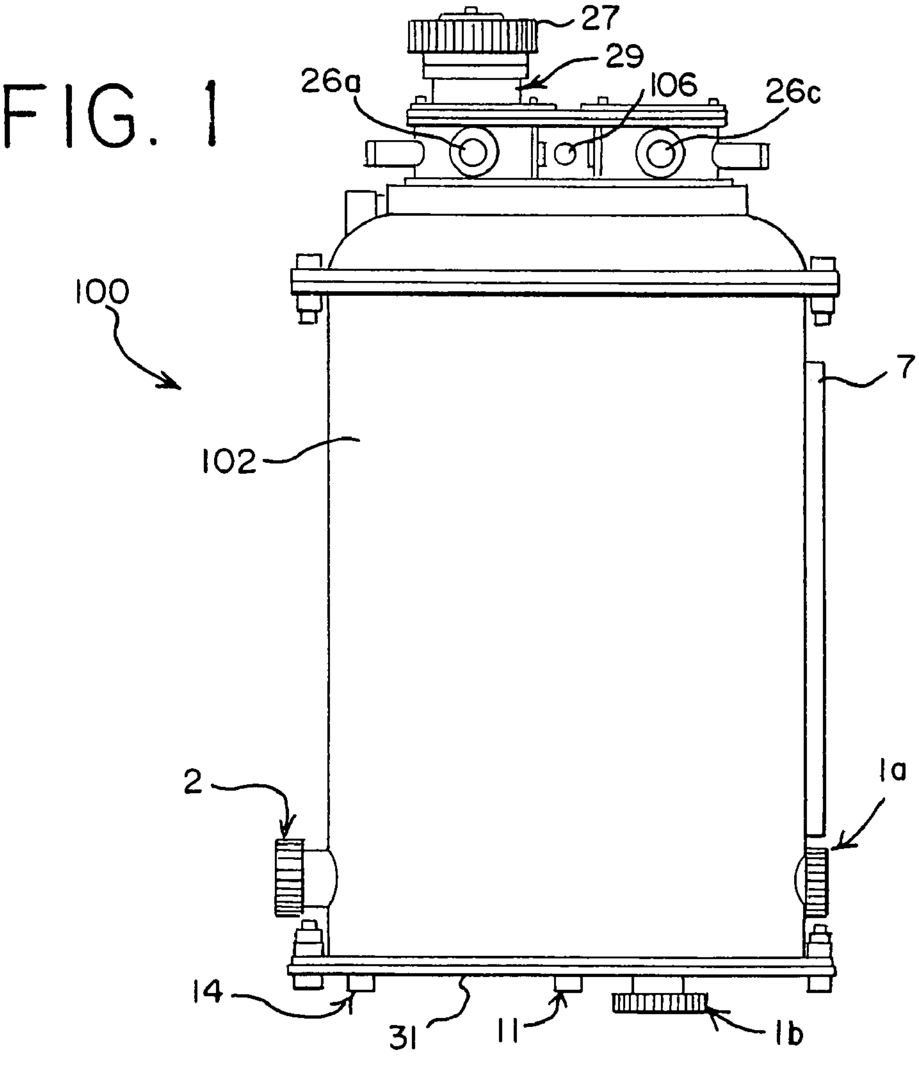
FIG. 1 illustrates a side view of an apparatus for monitoring fluid flows and/or filter conditions and/or for distributing a single fluid in an embodiment of the present invention.
Figure 3:
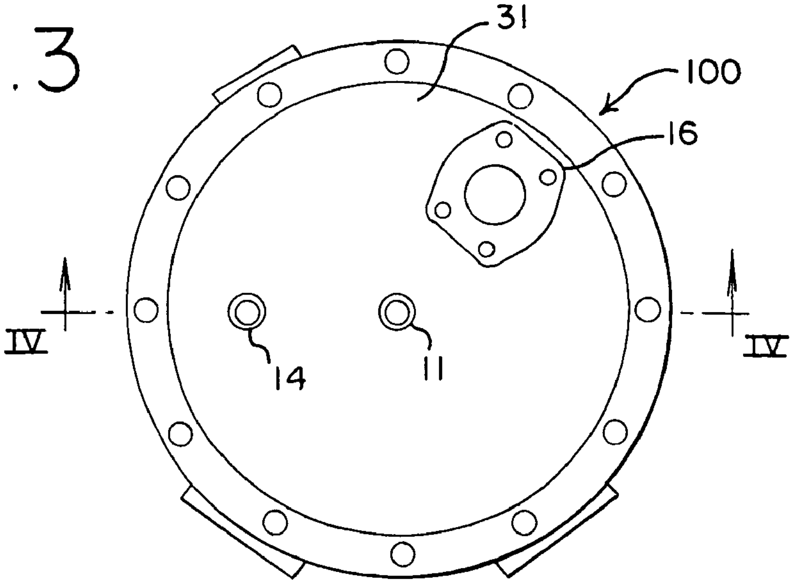
FIG. 3 illustrates a bottom view of an apparatus for monitoring fluid flows and/or filter conditions and/or for distributing a single fluid in an embodiment of the present invention.

Referring now to the drawings wherein like numerals refer to like parts, FIG. 1 illustrates a single fluid, multiple-volume, self-prioritized reservoir 100 (hereinafter "the reservoir 100") in an embodiment of the present invention. The reservoir 100 may have an interior 101 and/or an exterior surface 102 as illustrated in FIG. 3. The interior 101 may be a concentric circular partition 30 (hereinafter "the partition 30") to form and/or to separate a first volume 20 and/or a second volume 22. A bottom end 103 of the partition 30 may be sealed to, may be connected to and/or may be attached to a bottom 31 of the reservoir 100. A top end 33 of the partition 30 may be unattached to the interior 101 of the reservoir 100. A single fluid (hereinafter "fluid") in the interior 101 of the reservoir 100 may mix and/or may flow between the first volume 20 and the second volume 22 of the reservoir 100.

The reservoir 100 may have primary outlet ports 1*a*, 1*b*, a secondary outlet port 2, a first drain 11 and/or a second drain 14. The primary outlets ports 1*a*, 1*b*, the secondary outlet port 2, the first drain 11 and/or the second drain 14 may extend from the interior 101 through the reservoir 100 to the exterior surface 102. The fluid may be within the second volume 22 and/or may pass from the second volume 22 of the interior 101 to the exterior surface 102 of the reservoir 100 via the primary outlet ports 1*a*, 1*b* and/or the drain 11. The fluid may be within the first volume 2 and/or may pass from the first volume 20 of the interior 101 to the exterior surface 102 of the reservoir 100 via the secondary outlet port 2 and/or the drain 14. As a result, the fluid within the interior 101 of the reservoir 100 may be distributed from and/or may be transferred from the interior 101 via the primary outlet ports 1*a*, 1*b*, the secondary outlet port 2 and/or the drains 11, 14. The primary outlet ports 1*a*, 1*b* and/or the secondary outlet port 2 may be attached to and/or may be connected to one or more hydraulic systems (not shown in the figures). As a result, the fluid may be supplied to, may be distributed to, may be received by and/or may be transferred to one or more hydraulic systems via the primary outlet ports 1*a*, 1*b* and/or the secondary port 2.

Figure 2:
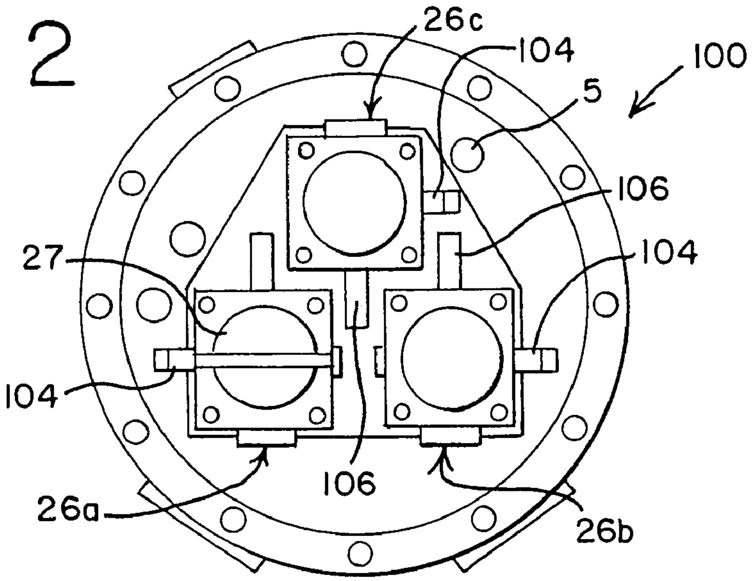
FIG. 2 illustrates a top view of an apparatus for monitoring fluid flows and/or filter conditions and/or for distributing a single fluid in an embodiment of the present invention.
Figure 4:
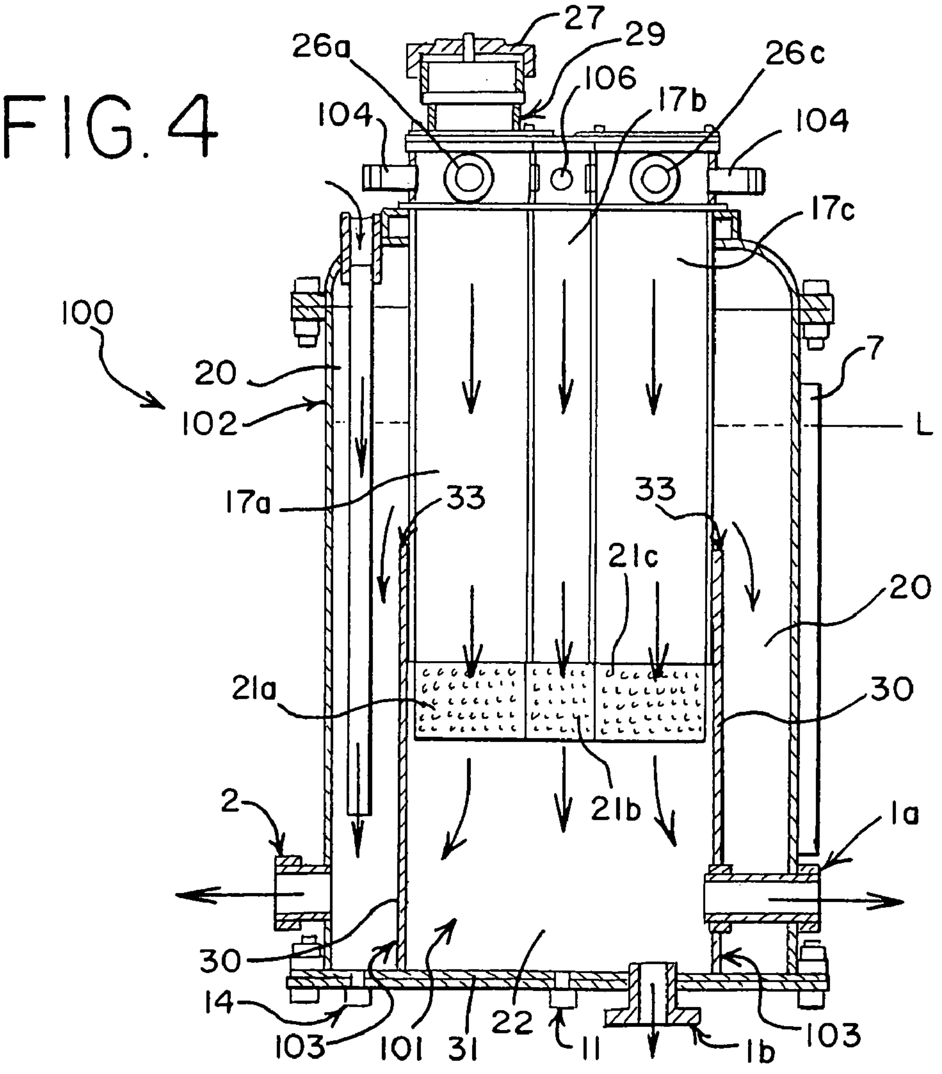
FIG. 4 illustrates a cross-sectional view of the apparatus in FIG. 3 as taken along line IV-IV in an embodiment of the present invention.

As illustrated in FIGS. 1, 2 and 4, the reservoir 100 may have a first fluid inlet 26*a*, a second fluid inlet 26*b* and/or a third fluid inlet 26*c*. The fluid inlets 26*a*-26*c* may be formed with and/or may have a first return filter 21*a*, a second return filter 21*b* and/or a third return filter 21*c*, respectively as shown in FIG. 4. The return filters 21*a*-21*c* may project into the interior 101 of the reservoir 100 from the fluid inlets 26*a*-26*c*. A first sleeve 17*a*, a second sleeve 17*b* and/or a third sleeve 17*c* may be attached to and/or may be connected to the fluid inlets 26*a*-26*c*, respectively. The sleeves 17*a*-17*c* may be attached to and/or may be connected to the interior 101 of the reservoir 100. The return filters 21*a*-21*c* may be inserted into, may be connected to and/or may be located within the sleeves 17*a*-17*c*, respectively. The return filters 21*a*-21*c* may extend outward with respect to the sleeves 17*a*-17*c* into the second volume 22 of the interior 101. As a result, the return filters 21*a*-21*c* may extend within and/or may be located within the second volume 22 of the reservoir 100. The return filters 21*a*-21*c* may direct a flow of the fluid into the second volume 22 to add the fluid to the reservoir 100.

The first fluid inlet 26*a* may have a filler neck 29 which may be covered by a cap 27 to seal the first fluid inlet 26*a* as shown in FIGS. 1 and 4. The cap 27 may be attached to and/or may be connected to the filler neck 29. As a result, the cap 27 may enclose and/or may seal the first fluid inlet 26*a* and/or the first return filter 21*a*. The filler neck 29 may prevent the fluid from passing upward through the filler neck 29 as the fluid within the filler neck 29 may be pressurized and/or the cap 27 may be removed from the filler neck 29.

The fluid inlets 26*a*-26*c* may connect and/or may attach one or more hydraulic systems to the interior 101 of the reservoir 100. As illustrated in FIG. 4, the fluid may be added to and/or may be transferred to the interior 101 of the reservoir 100 via the fluid inlets 26*a*-26*c* and/or the return filters 21*a*-21*c*, respectively. The fluid from one or more hydraulic systems may be added to and/or may be transferred to the second volume 22 of the interior 101 via one or more of the fluid inlets 26*a*-26*c*. The filler neck 29 and/or the first return filter 21*a* may remove dirt, dust, moisture and/or contaminants in the fluid which may be added to the interior 101 via the first fluid inlet 26*a*. The second return filter 21*b*and/or the third return filter 21*c* may remove dirt, dust, moisture and/or contaminants in the fluid which may be added to the interior 101 via the second fluid inlet 26*b*and/or the third fluid inlet 26*c*, respectively. The filler neck 29 and/or the return filters 21*a*-21*c* may prevent any dirt, dust, moisture and/or contaminants in the fluid from entering the interior 101 of the reservoir 100.

Each of the fluid inlets 26*a*-26*c* may have a valve 104 and/or a sensor 106. The valve 104 may be, for example, a fluid sample valve and/or the like. A sample of the fluid which may be in the fluid inlets 26*a*-26*c* may be removed and/or may be extracted via the valve 104. The sensor 106 may monitor, may determine and/or may detect fluid flows, such as, for example, a viscosity and fluid conditions, such as, for example, a temperature of the fluid in the fluid inlets 26*a*-26*c*. Further, the sensor 106 may monitor, may determine and/or may detect filter conditions of the fluid inlets 26*a*-26*c*. Moreover, the sensor 106 may monitor, may determine and/or may detect presence of dirt, dust, moisture and/or contaminants in the fluid within the fluid inlets 26*a*-26*c*.

The fluid may flow into, may be added to and/or may enter the interior 101 of the reservoir 100 via one or more of the fluid inlets 26*a*-26*c* through the return filters 21*a*-21*c* into the second volume 22. The first volume 20 may receive any fluid which may overflow the partition 30 from the volume 22. The fluid from the fluid inlets 26*a*-26*c* may raise and/or may pass over the partition 30 and/or may overflow from the second volume 22 to the first volume 20.

The fluid may be mixed by a cascading of the fluid and/or a passing of the fluid from the second volume 22 over the partition 30 to the first volume 20. The primary outlet port 1*a* and/or the secondary outlet port 2 may be positioned tangentially with respect to the reservoir 100 to promote a centrifugal fluid flow. A centrifugal fluid flow may remove dirt, dust, moisture and/or contaminants in the fluid within the first volume 20 and/or the second volume 22. As a result, the primary outlet port 1*a* and/or the secondary outlet port 2 may prevent dirt, dust, moisture and/or contaminants within the interior 101 of the reservoir from being distributed, from being transferred and/or from being sent to one or more hydraulic systems. The primary outlet ports 1*a*, 1*b* and/or the secondary outlet port 2 may be positioned in the reservoir. 100 to distribute and/or to transfer the fluid from the second volume 22 and/or the first volume 20 to one or more hydraulic systems.

A site-glass level gage 7 and/or an electronic level sensor 5 may be attached to and/or may be connected to the interior 101 of the reservoir 100 as shown in FIGS. 1, 2 and 4. The site-glass level gage 7 and/or the electronic level sensor 5 may permit monitoring of a level L of the fluid in the reservoir 100 as illustrated in FIG. 4. Monitoring the level L of the fluid in the reservoir 100 may be based on, may correspond to and/or may represent a level for one or more hydraulic systems.

Figure 5:
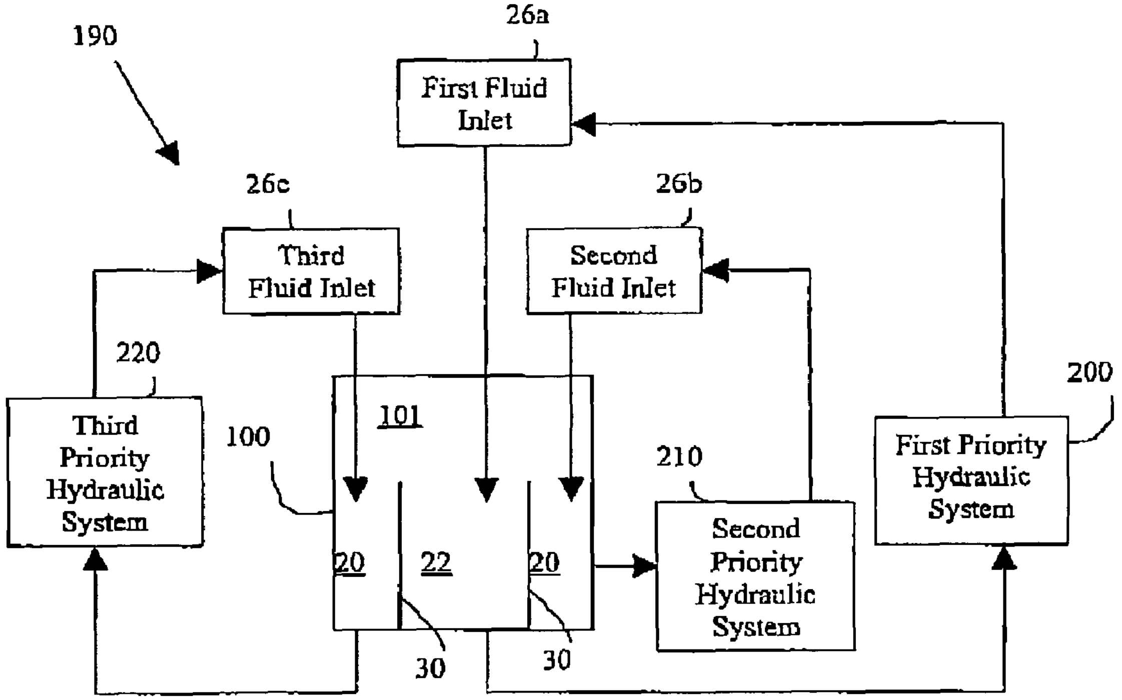
FIG. 5 illustrates a black box diagram of a system for monitoring fluid flows and/or filter conditions and/or for distributing a single fluid in an embodiment of the present invention.

FIG. 5 illustrates a black box diagram of a system 190 for monitoring fluid flows and/or filter conditions in an embodiment of the present invention. The system 190 may supply, may distribute and/or may transfer the fluid from the interior 101 of the reservoir 100 to, for example, a first priority hydraulic system 200, a second priority hydraulic circuit 210 and/or a third priority hydraulic circuit 220. The fluid from the volume 22 may be assigned a first priority for supplying the first priority hydraulic circuit 200. The first priority hydraulic circuit 200 may be connected to and/or may be attached to the second volume 22 via the first primary outlet port 1*a* and/or the second primary outlet port 1*b*.

The first priority hydraulic circuit 200 may request and/or may demand the fluid from the second volume 22. As a result, the fluid may flow from, may be distributed from and/or may be transferred from the second volume 22 to the first priority hydraulic circuit 200 via the first primary outlet port 1*a* and/or the second primary outlet port 1*b*. The first priority hydraulic circuit 200 may be a critical hydraulic system, for example, an emergency steering hydraulic system. It should be understood that the present invention should not be limited to a specific embodiment of the critical hydraulic system. The first priority hydraulic circuit 200 may be connected to and/or may be attached to the first fluid inlet 26*a*. The fluid may be returned to the second volume 22 from the first priority hydraulic circuit 200 through the first fluid inlet 26*a*. Further, the fluid may pass through the first return filter 21*a* and/or may return to the reservoir 100 and/or the second volume 22. The first priority hydraulic circuit 200 may have immediate access to the fluid returning to the reservoir 100 before delivery of the fluid to the first volume 20 and/or to the fluid which may be contained in the second volume 22. Moreover, the first priority hydraulic circuit 200 may access, may receive and/or may use the fluid at a level above the partition 30 in the first volume 20.

The fluid from the first volume 20 may be given second priority. The first volume 20 may access the fluid returning to the reservoir 100 which may be available after the demand from the second volume 22 may be fulfilled and/or may be accomplished. The secondary outlet port 2 may be connected to and/or may be attached to the second priority hydraulic circuit 210 and/or the third priority hydraulic circuit 220. For example, the fluid of the first volume 20 may be distributed to the second priority hydraulic circuit 210 and/or the third priority hydraulic circuit 220 via the secondary outlet port 2. The second priority hydraulic circuit 210 may be, for example, a primary steering hydraulic system, an optional "top-off" hydraulic system and/or the like. The third priority hydraulic circuit 220 may be, for example, a transmission clutch circuit, the main-pump compensator circuit, the fan-drive motor supply circuit, the compensator circuit, the retarder circuit, the cooling fan circuit, the auxiliary supply circuit, the transmission lubrication circuit and/or the like. The present invention should not be limited to a specific embodiment of the second priority hydraulic circuit 210 and/or the third priority hydraulic circuit 220.

The second priority hydraulic circuit 210 and/or the third priority hydraulic circuit 220 may use, may process and/or may exhaust the fluid from the first volume 20 of the reservoir 100. The fluid may be returned to the first volume 20 from the second priority hydraulic circuit 210 and/or the third priority hydraulic circuit 220 via the second fluid inlet 26*b* and/or the third fluid inlet 26*c*, respectively. Further, the fluid may pass through the second return filter 21*b* and/or the third return filter 21*c* and/or may return to the reservoir 100 and/or the first volume 20. The fluid from the second inlet 26*b* and/or the third inlet 26*c* may combine with the fluid from the first priority hydraulic circuit 200 and/or may return to the reservoir 100. The first priority hydraulic circuit 200 and/or the second priority hydraulic circuit 210 may utilize the fluid returning to the first volume 20 and/or the second volume 22 of the reservoir 100. Further, the second priority hydraulic circuit 210 and/or the third priority hydraulic circuit 220 may access fluid at a level above the partition 30 of the reservoir 100.

The system 190 may be filled with an operating fluid, such as, for example, motor oil and/or the like. The operating fluid may permit operation over a wide ambient temperature range without changing the operating fluid and/or may have a high miscibility with other fluids, a high inherent viscosity index, wide compatibility and/or the like. The present invention should not be limited to a specific embodiment of the operating fluid. It should be understood that the operating fluid may be any operating fluid that may be implemented by one having ordinary skill in the art.

The system 190 may supply and/or may maintain fluid requirements of the first priority hydraulic circuit 200, the second priority hydraulic circuit 210 and/or the third priority hydraulic circuit 220 with the fluid from the reservoir 100. The filtered inlets 26*a*-26*c* may transfer and/or may add the fluid to the reservoir 100. Each of the filtered inlets 26*a*-26*c* may have the sensor 106 to monitor, to detect and/or to determine fluid flows, fluid conditions and/or filter conditions of the filtered inlets 26*a*-26*c*. Distribution of the fluid to the priority hydraulic circuits 200, 210, 220 may be prioritized by the fluid in the first volume 20 or in the second volume 22 of the interior 101 of the reservoir 100. The partition 30 in the interior 101 of the reservoir 100 may separate the second volume 22 from the first volume 20 of the reservoir 100. The reservoir 100 may have the outlet ports 1*a*, 1*b*, 2 for distributing the fluid to the priority hydraulic circuits 200, 210, 220.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for distributing a single fluid to a first hydraulic system and a second hydraulic system, the apparatus comprising:

a container having a bottom and walls defining an interior;

a partition having a top end and a bottom end wherein the bottom end of the partition is attached to the bottom of the container forming a first volume and a second volume in the container wherein the second volume surrounds the first volume;

a plurality of fluid inlets in communication with the container wherein a first fluid inlet is in communication with the first hydraulic system and further wherein the first fluid inlet is disposed within the first volume and wherein a second fluid inlet is in communication with the second hydraulic system and further wherein the second fluid inlet is disposed within the second volume and wherein the single fluid is added to the container via one of the plurality of fluid inlets; and an outlet port located within the interior of the container wherein the single fluid is distributed from the container to the hydraulic system via the outlet port.

2. The apparatus of claim 1 further comprising:

a sensor connected at one of the plurality of fluid inlets wherein the sensor detects fluid flow of the single fluid.

3. The apparatus of claim 1 further comprising:

a valve connected to one of the plurality of fluid inlets wherein the single fluid is monitored via the valve.

4. The apparatus of claim 1 further comprising:

a filter associated with one of the plurality of fluid inlets wherein the filter removes a contaminant from the single fluid.

5. The apparatus of claim 1 further comprising:

a gage installed in the wall of the container wherein the gage indicates a level of the single fluid in the container.

6. The apparatus of claim 1 further comprising:

a level sensor connected to the interior of the container wherein the level sensor indicates a level of the single fluid in the container.

7. The apparatus of claim 1 further comprising:

a sleeve connected to one of the plurality of fluid inlets.

8. The apparatus of claim 1 wherein the second volume receives the single fluid from the first volume.

9. A system for monitoring fluid flow of a single fluid to a first hydraulic system and a second hydraulic system, the system comprising:

a reservoir having a bottom and walls defining an interior;

a partition having a top end and a bottom end wherein the bottom end of the partition is attached to the bottom of the reservoir forming a first volume and a second volume in the reservoir wherein the second volume surrounds the first volume;

a plurality of fluid inlets in communication with the reservoir where a first fluid inlet is in communication with the first hydraulic system and further wherein the first fluid inlet is disposed within the first volume and wherein a second fluid inlet is in communication with the second hydraulic system and further wherein the second fluid inlet is disposed within the second volume and wherein the single fluid is added to the reservoir via one of the plurality of fluid inlets; and a sensor connected to one of the plurality of fluid inlets wherein the sensor detects the fluid flow of the single fluid into the reservoir.

10. The system of claim 9 further comprising: an outlet port within the interior of the reservoir.

11. The system of claim 9 further comprising:

a filter attached to one of the plurality of fluid inlets wherein the filter removes a contaminant from the single fluid.

12. The system of claim 9 further comprising:

a valve connected to one of the plurality of fluid inlets wherein the single fluid is monitored via the valve.

13. The system of claim 9 wherein the second volume receives the single fluid from the first volume.

14. The system of claim 9 wherein the single fluid is distributed from the interior of the reservoir via the outlet port.

15. A method for distributing a single fluid to a first hydraulic system and a second hydraulic system, the method comprising the steps of:

providing a reservoir defining an interior;

dividing the interior of the reservoir into a first volume and a second volume;

inserting a plurality of fluid inlets into the reservoir wherein a first fluid inlet is inserted into the first volume of the reservoir, the single fluid receivable from the first hydraulic system by the first volume via the first fluid inlet and wherein a second fluid inlet is inserted into the second volume of the reservoir, the single fluid receivable from the second hydraulic system by the second volume via the second fluid inlet and wherein the single fluid is added to the reservoir via one of the plurality of fluid inlets; and providing a first outlet port within the first volume and a second outlet port within the second volume wherein the single fluid is distributed from the interior of the reservoir.

16. The method of claim 15 further comprising the step of:

monitoring a level of the single fluid within the reservoir.

17. The method of claim 15 further comprising the step of:

detecting fluid flow of the single fluid.

18. The method of claim 15 further comprising the step of:

removing a contaminant from the single fluid.

19. The method of claim 15 further comprising the step of:

adding the single fluid to the second volume via the first volume.

20. The method of claim 15 further comprising the step of:

transferring the single fluid in the interior of the reservoir to the first hydraulic system.

21. An apparatus for distributing a single fluid to a first hydraulic system and a second hydraulic system, the apparatus comprising:

a container having a bottom and walls wherein the bottom and the walls define an interior;

a partition having a top end and a bottom end wherein the bottom end of the partition is attached to the bottom of the container to form a first volume and a second volume in the container wherein the second volume surrounds the first volume and further wherein the first volume is in communication with the second volume to allow the single fluid to flow between the first volume and the second volume;

a plurality of fluid inlets in communication with the container wherein a first fluid inlet is in communication with the first hydraulic system and further wherein the first fluid inlet is disposed within the first volume wherein the single fluid is added to the first volume from the first hydraulic system via the first fluid inlet and wherein a second fluid inlet is in communication with the second hydraulic system and further wherein the second fluid inlet is disposed within the second volume wherein the single fluid is added to the second volume from the second hydraulic system via the second fluid inlet; and a first outlet port within the first volume and a second outlet port within the second volume wherein the single fluid is distributed from the interior of the reservoir.

* * * * *